(12) United States Patent
Hamelin

(10) Patent No.: US 11,755,436 B2
(45) Date of Patent: Sep. 12, 2023

(54) COMPUTER SYSTEM INSTALLED ON BOARD A CARRIER IMPLEMENTING AT LEAST ONE SERVICE CRITICAL FOR THE OPERATING SAFETY OF THE CARRIER

(71) Applicant: COMMISSARIAT A L'ENERGIE ATOMIQUE ET AUX ENERGIES ALTERNATIVES, Paris (FR)

(72) Inventor: Etienne Hamelin, Gif-sur-Yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/777,967

(22) PCT Filed: Nov. 12, 2020

(86) PCT No.: PCT/EP2020/081922
§ 371 (c)(1),
(2) Date: May 18, 2022

(87) PCT Pub. No.: WO2021/110380
PCT Pub. Date: Jun. 10, 2021

(65) Prior Publication Data
US 2023/0012925 A1 Jan. 19, 2023

(30) Foreign Application Priority Data
Dec. 6, 2019 (FR) ...................................... 1913853

(51) Int. Cl.
*G06F 11/00* (2006.01)
*G06F 11/20* (2006.01)
(Continued)

(52) U.S. Cl.
CPC ...... *G06F 11/2048* (2013.01); *G06F 11/0754* (2013.01); *G06F 11/1629* (2013.01); *G06F 11/183* (2013.01); *G06F 2201/85* (2013.01)

(58) Field of Classification Search
CPC ............. G06F 11/0754; G06F 11/1629; G06F 11/1641; G06F 11/1645; G06F 11/165;
(Continued)

(56) References Cited

U.S. PATENT DOCUMENTS 9,836,354 B1 * 12/2017 Potlapally ........... G06F 11/1484
2013/0212441 A1 * 8/2013 Vilela ................. G06F 11/1641
714/49

(Continued)

FOREIGN PATENT DOCUMENTS

| FR | 2 989 488 A1 | 10/2013 |
| WO | 01/46806 A1 | 6/2001 |

*Primary Examiner* — Marc Duncan
(74) *Attorney, Agent, or Firm* — BakerHostetler

(57) ABSTRACT

A computer system installed on board a carrier, communicating in a network with a data concentrator and with a monitor, and implementing at least one service that is critical for the operating safety of the carrier, the critical service being redundant in at least two instances ($\delta_1, \ldots \delta_m$) on different respective computers ($C_1, \ldots, C_m$) connected to the network, each computer ($C_k$) implementing at least one software task implementing an instance ($\delta_k$) of the critical service being configured to implement the critical service by way of time control.

10 Claims, 2 Drawing Sheets

(51) Int. Cl.
  *G06F 11/16* (2006.01)
  *G06F 11/18* (2006.01)
  *G06F 11/07* (2006.01)

(58) Field of Classification Search
  CPC ... G06F 11/1658; G06F 11/184; G06F 11/185
  See application file for complete search history.

(56) References Cited

U.S. PATENT DOCUMENTS

2017/0116089 A1    4/2017  Park et al.
2019/0235448 A1    8/2019  Banginwar et al.
2020/0174897 A1*   6/2020  McNamara ........... G06F 9/5027

* cited by examiner

COMPUTER SYSTEM INSTALLED ON BOARD A CARRIER IMPLEMENTING AT LEAST ONE SERVICE CRITICAL FOR THE OPERATING SAFETY OF THE CARRIER

CROSS-REFERENCE TO RELATED APPLICATIONS

This application is a National Stage of International patent application PCT/EP2020/081922, filed on Nov. 12, 2020, which claims priority to foreign French patent application No. FR 1913853, filed on Dec. 6, 2019, the disclosures of which are incorporated by reference in their entirety.

FIELD OF THE INVENTION

The invention relates to an onboard hardware and/or software architecture made up of software services (or components), interacting with a device that concentrates the data (for example an "oriented service" architecture equipped with a data concentrator or "broker" or "data functional bus").

BACKGROUND

Certain functions critical for operating safety are implemented by complex onboard systems implemented in hardware and software form, such as triggering of airbags or automatic emergency braking of a vehicle.

It is particularly difficult and costly to develop and prepare (or even certify) these systems for adequate operating safety, and it is all the more complex and costly when the underlying hardware or software architecture is complex.

To improve the safety and availability of critical functions implemented in software, it is customary to roll out multiple redundant implementations in a mode called "lockstep", which consists in using at least two physical execution units (for example two computers or CPUs, the acronym for central processing unit, on one and the same system on chip, the acronym for which is SoC) executing exactly the same code at the same instant.

A hardware device integrated in the system on chip immediately detects when the registers, or the memory accesses, of the two cores are different: this signals that a fault has occurred in at least one of the two cores, and it is therefore necessary to switch over to a failsoft mode (for example restart the function, or deactivate it, signal the fault, engage a secondary execution mode, etc.).

However, conventional lockstep is possible only between two computers that are physically close, in order to compare their registers or their memories. The invention allows the use of networked remote computers.

Conventional lockstep requires identical execution units executing exactly the same set of software tasks (so that the executions are identical cycle for cycle, except when there is a fault).

SUMMARY OF THE INVENTION

It is an aim of the invention to overcome the aforementioned problems and in particular to provide for operating safety at reduced cost and with reduced complexity.

One proposal, according to one aspect of the invention, is a computer system installed on board a carrier, communicating in a network with a data concentrator and with a monitor, and implementing at least one service that is critical for the operating safety of the carrier, the critical service being redundant in at least two instances on different respective computers connected to said network,
  each computer implementing at least one software task implementing an instance of the critical service and being configured to implement the critical service by way of time control by using:
    an increasing sequence of task activation dates and a sequence of corresponding task latest end dates, relating to the starting of the system, with a gap between an end date and the corresponding activation date above or equal to a threshold corresponding to an estimate of the execution time or of the response time of the task;
    a backup of an internal state of the computer between two successive activations of the service by way of modeling by recording the memory states of the task;
    an update of the internal state of the computer on each activation of the service, starting after the corresponding activation date, reads the input data of the service and computes the output data of the service and provides them to the data concentrator, the dependency between firstly the updated internal state and the computed output data and secondly the previous internal state and the read input data being represented by a transfer function; and
    a relay server, or proxy, configured to compute a signature, which is characteristic of the execution of the instance of the service from the initial activation of the system to the current latest end date, by way of a hash chain dependent on a hash function on nb bits, and to transmit the signature to the monitor;
  the monitor detecting a fault by analyzing the signatures of the instances.

Such a system allows provision for operating safety at reduced cost and with reduced complexity.

In one embodiment, a relay server is configured to compute the signature by way of a hash chain using a cryptographic hash function H, by recurrence for each instance k, in each period (or time step) n, by way of the following relationship:
$h_{n+1}^k = H(h_n^k, i_n^k, o_n^k)$, in which:
  $h_{n+1}^k$ represents the signature of the instance k in the period n+1;
  $h_n^k$ represents the signature of the instance k in the period n;
  $i_n^k$ represents the input data of the service of the instance k in the period n; and
  $o_n^k$ represents the output data of the service of the instance k in the period n.

Thus, the value $h_n^k$, is a signature that is characteristic of the history of the input and output data of the critical service since it was started, the volume of data of which is constant, and low (typically 256 bits) in view of all of the input and output data of the critical service since it was started.

According to one embodiment, the monitor is configured to detect a temporal fault when a signature of the instances has not been received before the latest end date of the current period.

Thus, the monitor contributes to detecting the temporal faults of the instances of the critical service.

In one embodiment, the monitor is configured to compare the signatures received from the relay servers in order to detect an operational fault when one signature of the instances is different from the other signatures.

Thus, the monitor detects whether at least one of the instances of the critical service presents an operational fault.

According to one embodiment, the monitor detects a fault when the signatures of the instances are equal but one internal state and/or output data differ(s) from the others.

Thus, when the number of instances of the service is equal to at least three, and fewer than half of these instances are faulty, the monitor is configured to take a majority vote among the signatures received in time providing a majority signature denoting the operational instances, the signatures that are different from the majority signature denoting the faulty instances, and configured to signal to the remainder of the system the operational instances and the faulty instances so that the transmission of the faulty instances is interrupted on the data concentrator.

Thus, the device provides for detection and isolation of the operational and temporal faults of the replicas, and tolerance of breakdowns, which improves the overall availability of the service.

For example, when an instance is detected as faulty in a period $n_d$, the computer hosting the faulty instance is configured to retrieve a copy of a correct internal memory state of another operational instance corresponding to the period $n_d$, to restart the faulty instance from the correct memory state, and to feed back to the faulty instance the input data from the period $n_d$ to the current period, by applying the transfer function, possibly behind schedule in relation to the corresponding latest end dates, and the monitor is configured so as, when the faulty instance has caught up with the operational instances, that is to say has applied, before the $n^{th}$ latest end date, the transfer function to the inputs up to the period n, the signatures being equal again, to report the faulty instance as operational again.

Thus, the sequence of signatures allows identification of a faulty instance, identification of an operational instance on the basis of which the faulty instance will be restarted and replayed, and then identification of when the replay is finished and the instance is operational again.

According to one embodiment, a relay server is a software server implemented on the corresponding computer.

Thus, the implementation is simplified.

In one embodiment, a relay server is a hardware server implemented at the data concentrator.

Thus, the proxy is not subject to the risk of fault of the software executive like the instance that it watches over.

According to one embodiment, the system comprises a network that is independent of the data concentrator for transmitting the signatures by way of the relay servers, with a lower passband and higher reliability than those of the data concentrator.

Thus, there is less risk of the comparison of the signatures being compromised by an integrity flaw or temporal fault linked to the transmission between the relay server and the monitor.

Another proposal, according to another aspect of the invention, is a method for managing at least one service that is critical for the operating safety of a computer system installed on board a carrier, the critical service being redundant in at least two instances on different respective computers connected to said network, each implementation of an instance of the critical service using:

- an increasing sequence of task activation dates and a sequence of corresponding task latest end dates, relating to the starting of the system, with a gap between an end date and the corresponding activation date above or equal to a threshold corresponding to an estimate of the execution time or of the response time of the task;
- a backup of an internal state of the computer between two successive activations of the service by way of modeling by recording the memory states of the task;
- an update of the internal state of the computer on each activation of the service, starting after the corresponding activation date, reads the input data of the service and computes the output data of the service and provides them to the data concentrator, the dependency between firstly the updated internal state and the computed output data and secondly the previous internal state and the read input data being represented by a transfer function; and
- a computation of a signature by a relay server, which is characteristic of the execution of the instance of the service from the initial activation of the system to the current latest end date, by way of a hash chain dependent on a hash function on nb bits, and a transmission of the signature to the monitor;
- a detection of a fault by the monitor being performed by analyzing the signatures of the instances.

BRIEF DESCRIPTION OF THE DRAWINGS

The invention will be better understood on studying a few embodiments that are described using nonlimiting examples and are illustrated by the appended drawings, in which FIG. 1a schematically illustrates a system according to an aspect of the invention.

Throughout the figures, elements that have identical references are similar.

DETAILED DESCRIPTION

Figure 1A:
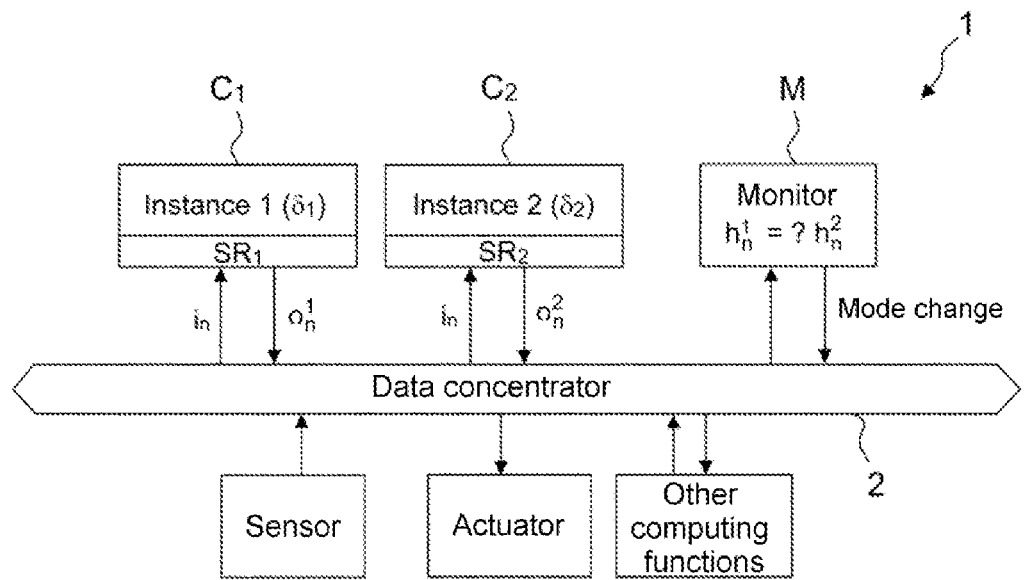
FIG. 1b schematically illustrates a system according to an aspect of the invention.
Figure 1B:
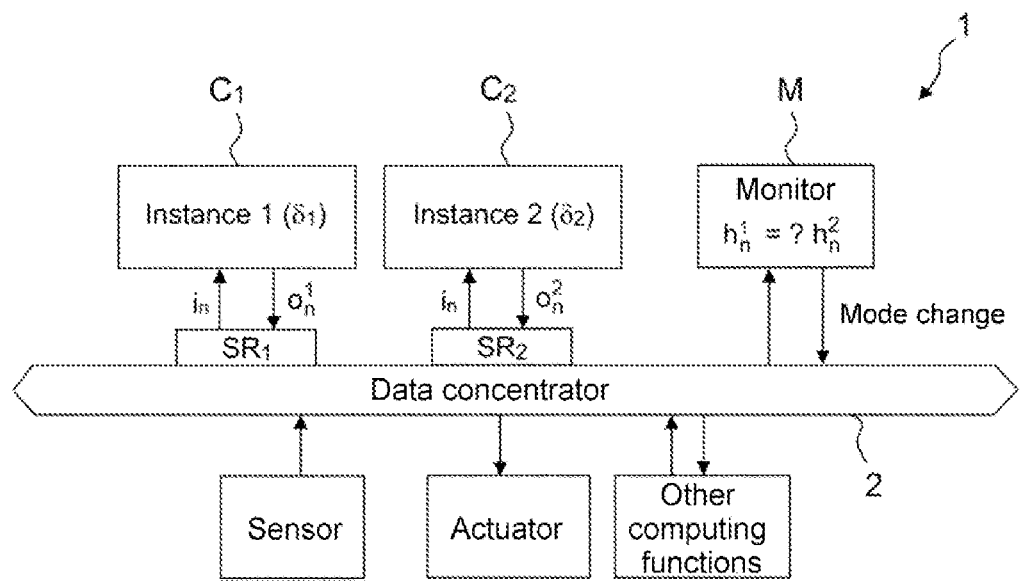

FIGS. 1a and 1b schematically illustrate a computer system 1 installed on board a carrier, according to two aspects of the invention.

A computer system 1 installed on board a carrier communicates in a network with a data concentrator 2 and with a monitor M and implements at least one service that is critical for the operating safety of the carrier, or safety critical, the critical service being redundant, i.e. executed in at least two instances $\delta_1, \ldots \delta_m$ on different respective computers $C_1, \ldots, C_m$ connected to said network, in this case two replicas on two respective computers.

Each computer $C_1, \ldots, C_m$ implements an instance $\delta_k$ of the critical service and is configured to implement the critical service by using:

- an increasing sequence of activation dates $R_n$ of the system and a sequence of corresponding latest end dates $D_n$, relating to the starting of the system, with a gap between an end date and the corresponding activation date above or equal to a threshold corresponding to an estimate of the execution time of the service WCET. The dates Rn and Dn comply with the following in equations: $\forall n, 0<R_n<R_{n+1}, 0<D_n<D_{n+1}$, and $D_n - R_n \geq WCET$;
- a backup of an internal state $s_n$ of the computer (modeling of the memory states, registers, variables of the code) between two successive activations of the service by way of modeling by recording the memory states of the computer;
- an update of the internal state $s_{n+1}$ of the computer on each activation n of the service, starting at the corresponding activation date $R_n$, reads the input data in of the service and computes the output data on of the service and provides them to the data concentrator 2, the dependency between firstly the updated internal state and the computed output data $s_{n+1}$, on and secondly the previous internal state and the read input data $s_n$, $i_n$ being represented by a transfer function f; and a relay server $SR_k$ configured to compute a signature $h_{n+1}^k$, which is characteristic of the execution of the instance δk of the service from the initial activation 0 of the system to the current latest end date $D_n$, by way of a hash chain dependent on a hash function H on nb bits, and to transmit the signature $h_{n+1}^k$ to the monitor M.

The monitor M detects a fault by analyzing the signatures $h_{n+1}^k$ of the instances $δ_1, \ldots δ_m$.

In FIG. 1*a*, a relay server $SR_k$ is a software server implemented on the corresponding computer $C_k$, and in FIG. 1*b*, a relay server $SR_k$ is a hardware server implemented at the data concentrator 2.

The hash function H is a cryptographic hash function, that is to say that, for a message of arbitrary size, it associates a fingerprint h, referred to as being fast to compute, that is resistant to preimage attacks (given a fingerprint h, it is impossible in practice to construct a message m such that H(m)=h), to second preimage attacks (knowing m1, it is impossible in practice to construct a message m2 such that H(m2)=H(m1)) and to collisions (it is impossible in practice to construct two different messages m1 and m2 such that H(m1)=H(m2)).

When a critical service is redundant, multiple instances δk (k=1, 2 . . . m) implement the same transfer function f, but are susceptible to faults. The variables modeling the operation of the instance k are called $X^k$, and that describing a theoretical flawless instance is called X.

Each instance $δ_k$ satisfies the same time constraints $R_n$ and $D_n$, is started in the same initial state $s_0^1 = s_0^2 = \ldots = s_0$ and receives the same inputs($i_n$) before the date $R_n$ (as a result of a multicast message being sent, or multiple sending). Therefore, in nominal mode, all instances compute exactly the same internal state values $s_n^1 = s_n^2 = \ldots = s_n$, and produce the same outputs $o_n^1 = o_n^2 = \ldots = o_n$, before the latest date $D_n$ of the current period.

The instances are not necessarily executed simultaneously; they may be executed on computers having different frequencies or may also be pre-empted by other tasks. The only necessary assumption is that the $n^{th}$ execution, or $n^{th}$ job, is effectively executed between the activation $R_n$ and current latest $D_n$ dates.

Let us suppose that the instance $δ_1$ has an error, which is activated during the $n^{th}$ job: internal fault $s_{n+1}^1 \neq s_{n+1}$ or external fault $o_n^1 \neq o_n$. The invention allows these faults to be detected as soon as possible, for the purpose of signaling, and, if necessary, for the purpose of triggering a failsoft mode of operation.

The present invention uses the computation of a signature $h_n^k$, which is characteristic of the execution of each instance $δ_k$ from when it is started to the current latest date $D_n$, and then transmission of these signatures to a monitor M, which compares them in order to detect an error.

The signature $h_n^k$, is computed by way of a hash chain $h_{n+1}^k = H(h_n^k, i_n^k, o_n^k, s_{n+1}^k)$ in which H is a hash function on nb bits. This computation may be performed by the instance $δ_k$. The signature $h_{n+1}^k$ is transmitted to the monitor M via the data concentrator 2 before the current latest date $D_n$. After the current latest date $D_n$, the monitor M compares all signatures $h_{n+1}^k$. In nominal mode, all signatures are equal.

Supposing that the system has remained in a nominal mode up to the latest date $D_{n-1}$, the monitor M detects a fault in the following cases:

if one of the signatures $h_{n+1}^k$ has not been received before the latest date $D_n$, which may be due to:

a temporal fault in the course of the nth job of the instance $δ_k$ (computation not finished in time, and violation of the latest date $D_n$), or a temporal fault in the transmission of a message comprising a signature $h_{n+1}^k$ by the network (or by its controllers or software), if one of the signatures $h_{n+1}^k$ is different from the others, which may be due to: a loss of integrity of the transfer function implementation $f_k \neq f$, activation of this error leads to a fault in the internal state $s_{n+1}^k \neq s_{n+1}$, or in the outputs $o_n^k \neq o_n$, a loss of integrity, or availability, of the inputs in received by the instance k on the activation date Rn: $i_n^k \neq i_n$, or an error in computing the signature by the relay server $SR_k$, a loss of integrity, or a delay in transmitting the message containing the signature $h_{n+1}^k$ to the monitor M: only these last cases correspond to a false positive (the monitor M then signals a fault on the instance $δ_k$, whereas it does not have a fault).

A false negative may occur when:

the monitor M itself is faulty; this risk may be reduced by various means, including redundancy of the monitor so that there would be at least two monitors M, M';

a majority of the instances $δ_k$ of the service are faulty and produce the same signature:

this risk is conventionally considered to be sufficiently improbable to be tolerated in the event of faults of a random, independent or transitory nature (if each instance has a probability p of suffering a random fault, and the faults of the instances are believed to be independent, then the probability of K replicas being faulty is $p^K$), the risk of constant faults or common modes is conventionally reduced by rigorous design, analysis and test processes, the signatures are all equal, and yet a replica deviates from its specification, that is to say: $\exists j \neq k$, $(o_n^j, s_{n+1}^j) \neq (o_n^k, s_{n+1}^k)$ and nevertheless $h_{n+1}^j = h_{n+1}^k$; that is to say a collision for the hash function:

for a cryptographic hash function or redundancy check of CRC type on nb bits, this collision has a probability of $$\frac{1}{2^{nb}}.$$

Selecting nb≥α $\log_2(10)$ reduces this risk to an acceptable probability of $\mathbb{P} \leq 10^{-\alpha}$. (for example, for a tolerated fault probability of $10^{-12}$ per hour of operation, with comparison of signatures in the period Π=10 ms, or $$\mathbb{P} = 10^{-12} \cdot \frac{10 \text{ ms}}{1 \text{ h}} \approx 2.8 \cdot 10^{-18}$$

per 10 ms, nb>64 bits is sufficient).

When the monitor M detects a deviation in the received signatures, it may signal this to an operating state management, or health management, device that will be responsible for deactivating the replicas, switching over to a failsoft mode, called FT, the acronym for fault tolerant, mode, or restarting all replicas in a reference state.

Additionally, if more than two replicas of the service are instantiated, the monitor M may determine, by way of a majority vote, the faulty instance(s) and selectively deactivate or restart them.

Figure 2:
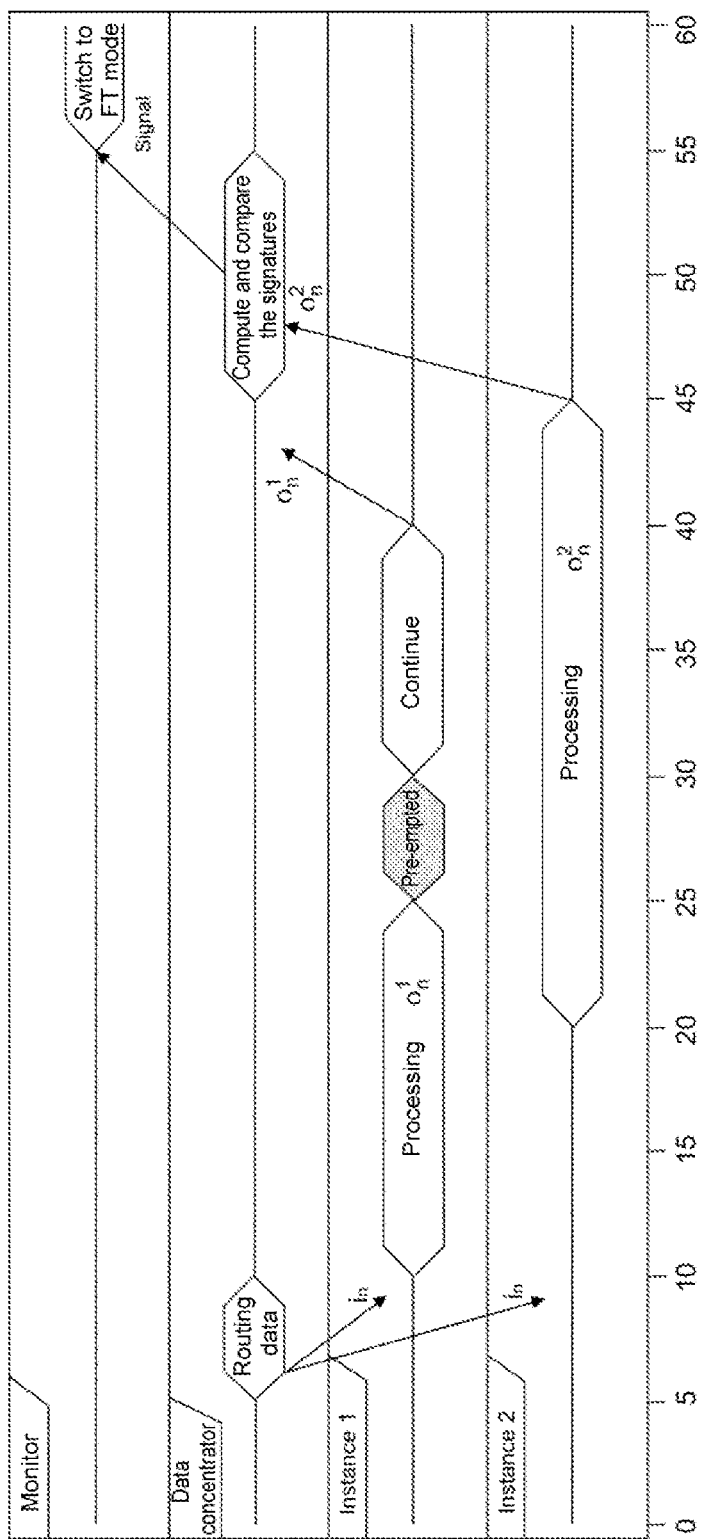
FIG. 2 schematically illustrates the operation of a system from FIG. 1, comprising two instances of the service.

As illustrated in FIG. 2, in order to restart a faulty instance $\delta_k$, it is necessary for a non-faulty instance $\delta_j$ to send it a copy of its last internal state $s_n^j$ and of the signature $h_{n+1}^j$ that are correct in the iteration n. The instance $\delta_k$ then copies them to its memory by overwriting the previously computed values (which are probably erroneous): $s_{n+1}^k \leftarrow s_{n+1}^j$ and $h_{n+1}^k \leftarrow h_{n+1}^j$; if necessary, during a replay phase up to the date $R_{n+r+1}$, the instance $\delta_k$ recomputes its internal and output states, and then, after the activation date $R_{n+1}$, the instance $\delta_k$ resumes the specified operation.

The invention allows very effective implementation of the redundancy principle, with fewer constraints than conventional lockstep, with limited network and computational overhead since the signature may be produced by a very short message. This load is reduced again if the signature computation is performed by a hardware accelerator.

As such, the signature generation device described in the patent FR2989488B1 provides an effective implementation of the signature of the execution. In the case of stateless functions ($s_n=\emptyset$), the signature may be computed by the data concentrator itself.

The invention claimed is:

1. A computer system installed on board a carrier, communicating in a network with a data concentrator and with a monitor (M), and implementing at least one service that is critical for the operating safety of the carrier, the critical service being redundant in at least two instances ($\delta_1, \ldots \delta_m$) on different respective computers ($C_1, \ldots, C_m$) connected to said network,
  each computer ($C_k$) implementing at least one software task implementing an instance ($\delta_k$) of the critical service and being configured to implement the critical service by way of time control by using:
  an increasing sequence of task activation dates ($R_n$) and a sequence of corresponding task latest end dates ($D_n$), relating to the starting (0) of the system, with a gap between an end date and the corresponding activation date above or equal to a threshold corresponding to an estimate of the execution time or of the response time of the task (WCET);
  a backup of an internal state ($s_n$) of the computer between two successive activations of the service by way of modeling by recording the memory states of the task;
  an update of the internal state ($s_{n+1}$) of the computer on each activation (n) of the service, starting after the corresponding activation date ($R_n$), reads the input data (in) of the service and computes the output data ($o_n$) of the service and provides them to the data concentrator, the dependency between firstly the updated internal state and the computed output data ($s_{n+1}$, on) and secondly the previous internal state and the read input data ($s_n$, $i_n$) being represented by a transfer function (f); and
  a relay server ($SR_k$) configured to compute a signature ($h_{n+1}^k$), which is characteristic of the execution of the instance ($\delta k$) of the service from the initial activation (0) of the system to the current latest end date ($D_n$), by way of a hash chain dependent on a hash function (H) on nb bits, and to transmit the signature ($h_{n+1}^k$) to the monitor (M);

the monitor (M) detecting a fault by analyzing the signatures ($h_{n+1}^1 \ldots h_{n+1}^m$) of the instances ($\delta_1, \ldots, \delta_m$).

2. The system as claimed in claim 1, wherein a relay server is configured to compute the signature by way of a hash chain using a cryptographic hash function H, by recurrence for each instance k, in each period n, by way of the following relationship:
$h_{n+1}^k = H(h_n^k, i_n^k, o_n^k)$, wherein:
  $h_{n+1}^k$ represents the signature of the instance k in the period n+1;
  $h_n^k$ represents the signature of the instance k in the period n;
  $i_n^k$ represents the input data of the service of the instance k in the period n; and
  $o_n^k$ represents the output data of the service of the instance k in the period n.

3. The system as claimed in claim 1, wherein the monitor (M) is configured to detect a temporal fault when a signature ($h_{n+1}^k$) of the instances ($\delta_1, \ldots, \delta_m$) has not been received before the latest end date ($D_n$) of the current period.

4. The system as claimed in claim 1, wherein the monitor (M) is configured to compare the signatures received from the relay servers ($SR_1, \ldots, SR_m$) in order to detect an operational fault when one signature ($h_{n+1}^k$) of the instances ($\delta_1, \ldots, \delta_m$) is different from the other signatures ($h_{n+1}^k$).

5. The system as claimed in claim 1, wherein, when the number of instances of the service is equal to at least three, and fewer than half of these instances are faulty, the monitor (M) is configured to take a majority vote among the signatures received in time providing a majority signature denoting the operational instances, the signatures that are different from the majority signature denoting the faulty instances, and configured to signal to the remainder of the system the operational instances and the faulty instances so that the transmission of the faulty instances is interrupted on the data concentrator.

6. The system as claimed in claim 5, wherein, when an instance is detected as faulty in a period $n_d$, the computer hosting the faulty instance is configured to retrieve a copy of a correct internal memory state of another operational instance corresponding to the period $n_d$, to restart the faulty instance from the correct memory state, and to feed back to the faulty instance the input data from the period $n_d$ to the current period, by applying the transfer function, possibly behind schedule in relation to the corresponding latest end dates, and the monitor (M) is configured so as, when the faulty instance has caught up with the operational instances, that is to say has applied, before the $n^{th}$ latest end date (Dn), the transfer function to the inputs up to the period n, the signatures being equal again, to report the faulty instance as operational again.

7. The system as claimed in claim 1, wherein a relay server ($SR_k$) is a software server implemented on the corresponding computer ($C_k$).

8. The system as claimed in claim 1, wherein a relay server ($SR_k$) is a hardware server implemented at the data concentrator.

9. The system as claimed in claim 1, comprising a network (RI) that is independent of the data concentrator for transmitting the signatures by way of the relay servers ($SR_k$), with a lower passband and higher reliability than those of the data concentrator.

10. A method for managing at least one service that is critical for the operating safety of a computer system as claimed in claim 1, installed on board a carrier, the critical service being redundant in at least two instances ($\delta_1, \ldots, \delta_m$) on different respective computers ($C_1, \ldots, C_m$) connected to said network,
   each implementation of an instance (Ok) of the critical service using:
      an increasing sequence of task activation dates ($R_n$) and a sequence of corresponding task latest end dates (Dn), relating to the starting (0) of the system, with a gap between an end date and the corresponding activation date above or equal to a threshold corresponding to an estimate of the execution time or of the response time of the task (WCET);
      a backup of an internal state ($s_n$) of the computer between two successive activations of the service by way of modeling by recording the memory states of the task;
      an update of the internal state ($s_{n+1}$) of the computer on each activation (n) of the service, starting after the corresponding activation date ($R_n$), reads the input data ($i_n$) of the service and computes the output data ($o_n$) of the service and provides them to the data concentrator, the dependency between firstly the updated internal state and the computed output data ($s_{n+1}$, on) and secondly the previous internal state and the read input data ($s_n$, $i_n$) being represented by a transfer function (f); and
      a computation of a signature ($h_{n+1}^k$) by a relay server, which is characteristic of the execution of the instance ($\delta k$) of the service from the initial activation (0) of the system to the current latest end date ($D_n$), by way of a hash chain dependent on a hash function (H) on nb bits, and a transmission of the signature ($h_{n+1}^k$) to the monitor (M);
   a detection of a fault by the monitor (M) being performed by analyzing the signatures ($h_{n+1}^k$) of the instances ($\delta_1, \ldots, \delta_m$).

* * * * *

UNITED STATES PATENT AND TRADEMARK OFFICE
CERTIFICATE OF CORRECTION

PATENT NO. : 11,755,436 B2  Page 1 of 1
APPLICATION NO. : 17/777967
DATED : September 12, 2023
INVENTOR(S) : Etienne Hamelin It is certified that error appears in the above-identified patent and that said Letters Patent is hereby corrected as shown below:

In the Claims

In Claim 1, Column 7, Line 54, "reads the input data (in)" should be -- reads the input data ($i_n$) --.

In Claim 10, Column 9, Line 4, "each implementation of an instance (Ok)" should be -- each implementation of an instance ($\delta k$) --.

In Claim 10, Column 9, Line 8, "task latest end dates (Dn)," should be -- task latest end dates ($D_n$), --.

In Claim 10, Column 10, Line 5, "and the computed output data (sn+1, on)" should be -- and the computed output data (sn+1, $o_n$) --.

Signed and Sealed this
Twenty-first Day of November, 2023

Katherine Kelly Vidal
*Director of the United States Patent and Trademark Office*